UNITED STATES PATENT OFFICE.

SIMEON HOLTON AND ORIN ABBEY, OF MIDDLEBURY, VERMONT, ASSIGNORS TO CHARLES C. PECK, OF MELROSE, MASSACHUSETTS.

IMPROVEMENT IN COMPOSITIONS FOR SOFTENING CAST-IRON.

Specification forming part of Letters Patent No. 223,138, dated December 30, 1879; application filed March 7, 1879.

*To all whom it may concern:*

Be it known that we, SIMEON HOLTON and ORIN ABBEY, both of Middlebury, in the county of Addison and State of Vermont, have invented jointly a new and useful Process for Softening Cast-Iron and Converting it into Steel, of which the following, taken in connection with the accompanying drawings, is a specification.

Our invention relates to a new composition for softening cast-iron and converting it into steel, and to an improved composition to be used in said process; and it consists in the use of a mixture of fine wood-ashes and finely-powdered charcoal as a bath or packing for treating cast-iron for the purpose of softening it and converting it into steel.

Iron castings are now annealed to make them softer or less brittle by placing them in iron boxes made air-tight and subjecting them to the heat of a furnace sufficient to heat the castings to a cherry-red for about eight days, and then allowing them to cool gradually.

This process works well; but it is expensive on account of the great length of time that the fire has to be kept up in the furnace to anneal a single batch, and it often happens that the mechanic cannot wait two weeks for malleable-iron castings, and therefore resorts to the much more expensive method of using forgings, whereas, if he could obtain malleable castings in two days' time, he would use them, and thereby make a great saving in cost.

This desirable end may be attained by the use of our composition, by which the hardest chilled casting may be softened in from one to six hours, according to size, so that it may be readily drilled, filed, or otherwise worked with perfect ease; or it may be drawn under the hammer, and when finished to the desired form it may be tempered or hardened by heating and immersing it in water, oil, or other tempering-liquid, in the same manner as ordinary steel, the cast-iron having, by the treatment received, been converted into steel of a low grade.

In applying our composition, we have found by practical experiment that the degree of heat necessary to be applied to the casting is somewhat variable, according to the quality of the iron used, a cherry-red heat answering very well when the iron is of a fine quality, and a low white heat being necessary when the iron is of a coarse or poor quality.

We have also found by experiment that three parts of fine wood-ashes and one of powdered charcoal give the best results for a packing or cooling bath, though the proportions of the mixture may be varied to a considerable extent without very materially affecting the result, and therefore we do not wish to limit ourselves to the exact proportions of the mixture here set forth as the best, or to heating the iron to be treated to a certain given temperature; but

What we claim as new, and desire to secure by Letters Patent of the United States, is—

A packing bath or composition for softening cast-iron, composed of fine wood-ashes and powdered charcoal thoroughly mixed, in about the proportions herein set forth.

Executed at Middlebury, Vermont, this 19th day of February, A. D. 1879.

ORIN ABBEY.
     SIMEON HOLTON.

Witnesses:
 WM. R. RUSSEL,
 E. P. HOLTON.